Sept. 25, 1956 C. E. COMPTON 2,764,397
AUGER MINING APPARATUS HAVING RIGIDLY
ATTACHED TRANSVERSE CONVEYOR
Original Filed Dec. 27, 1950 6 Sheets-Sheet 5
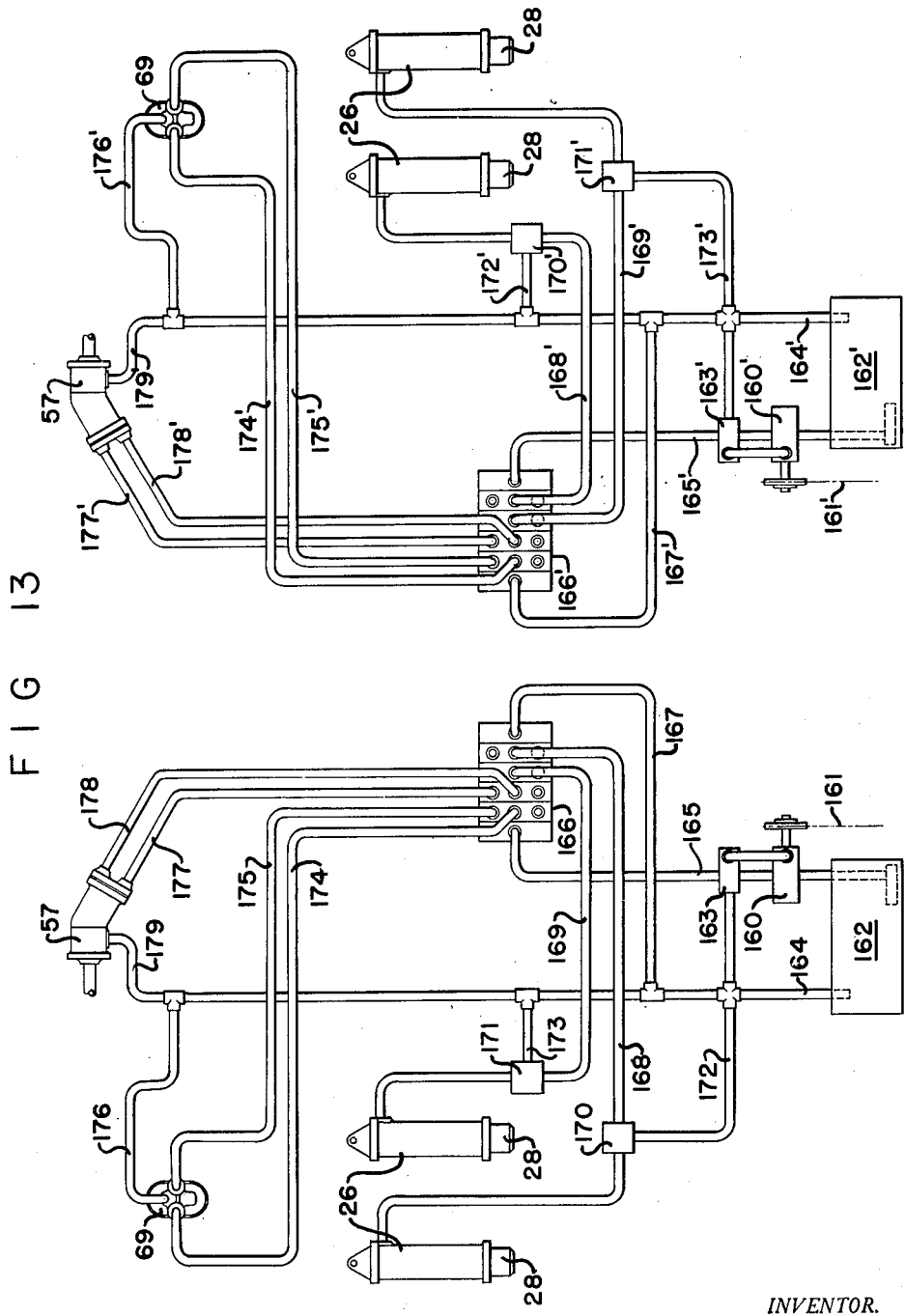
INVENTOR.
CHARLES E. COMPTON Sept. 25, 1956 C. E. COMPTON 2,764,397
AUGER MINING APPARATUS HAVING RIGIDLY
ATTACHED TRANSVERSE CONVEYOR
Original Filed Dec. 27, 1950 6 Sheets-Sheet 6
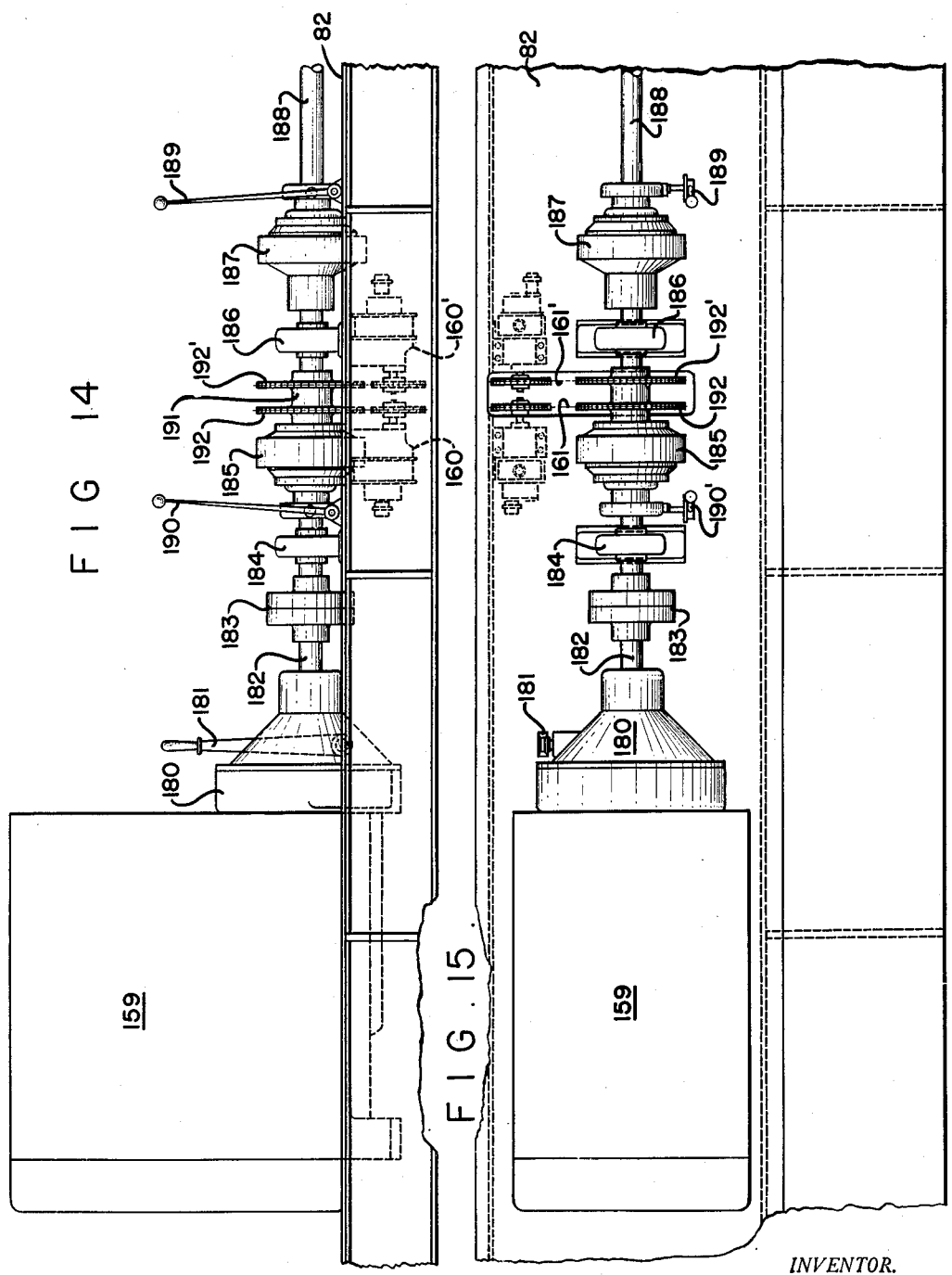
INVENTOR.
CHARLES E. COMPTON United States Patent Office 2,764,397
Patented Sept. 25, 1956

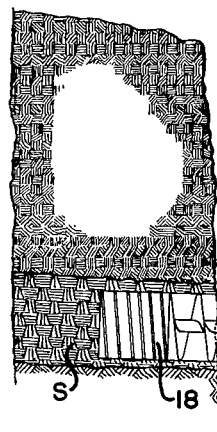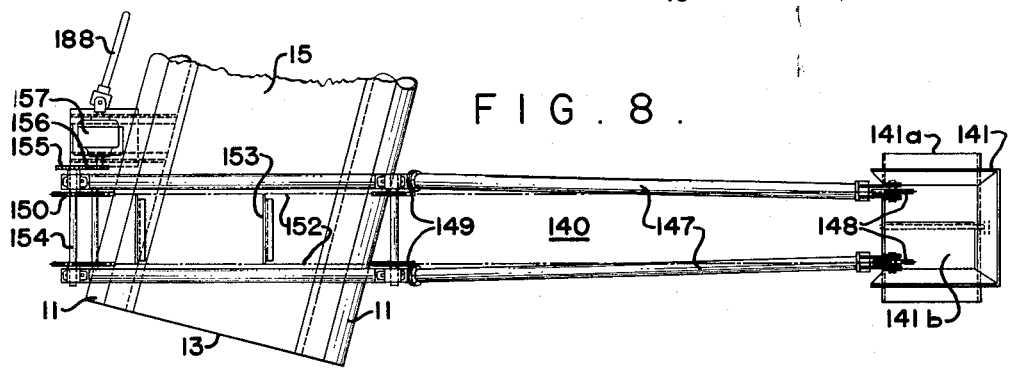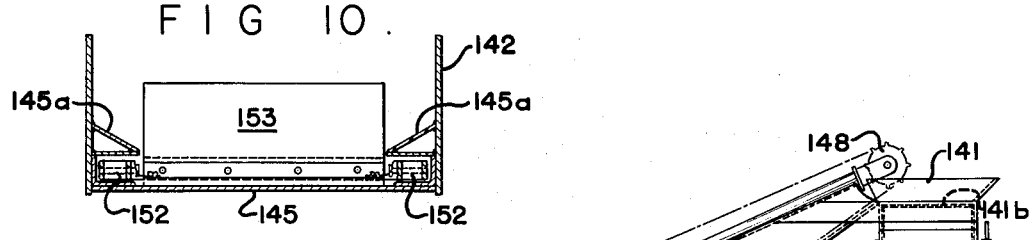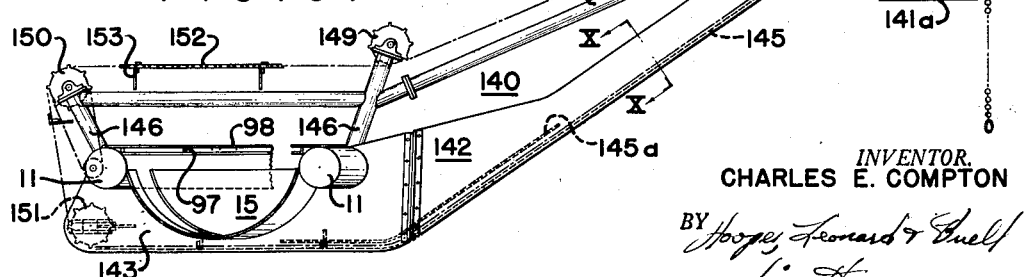

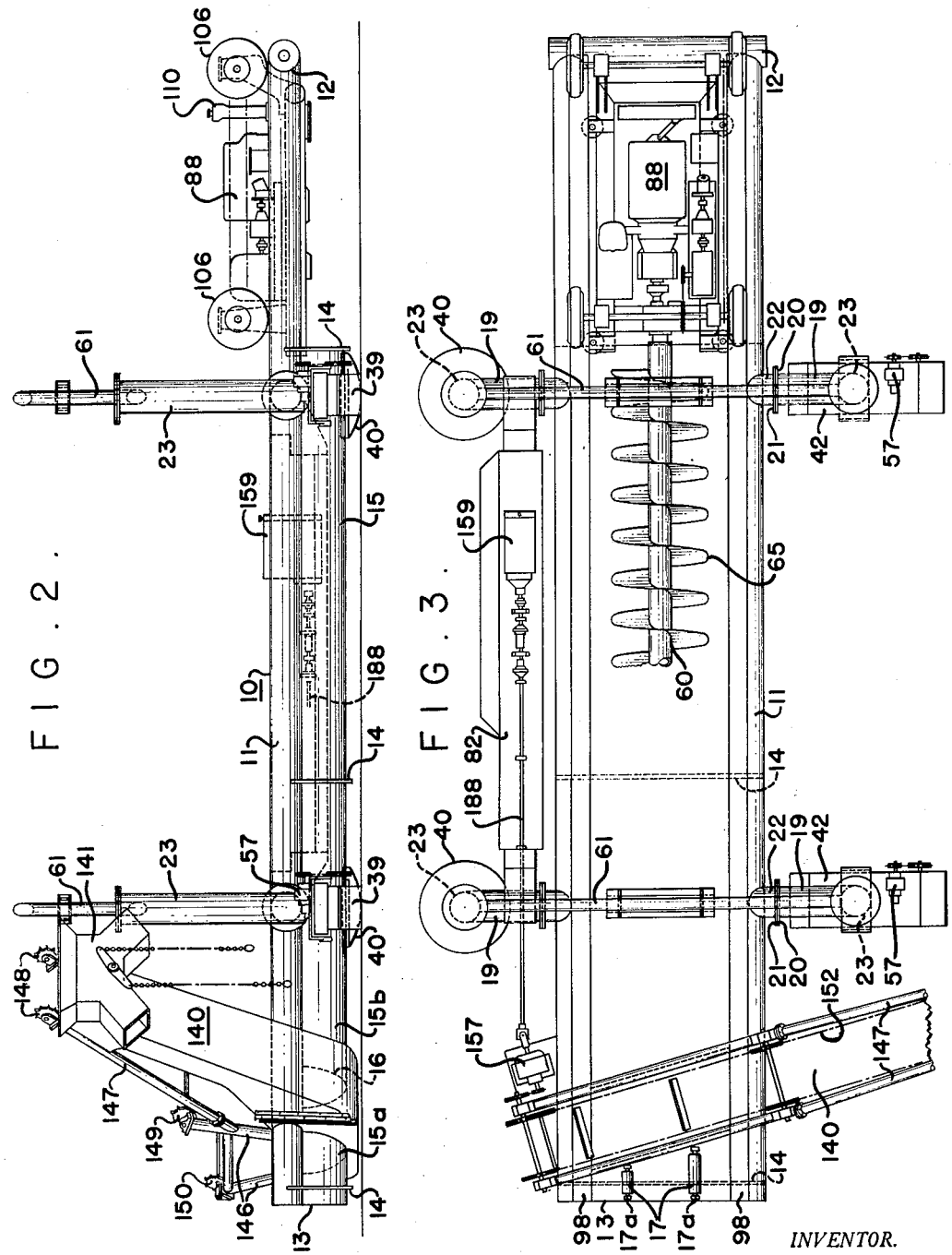

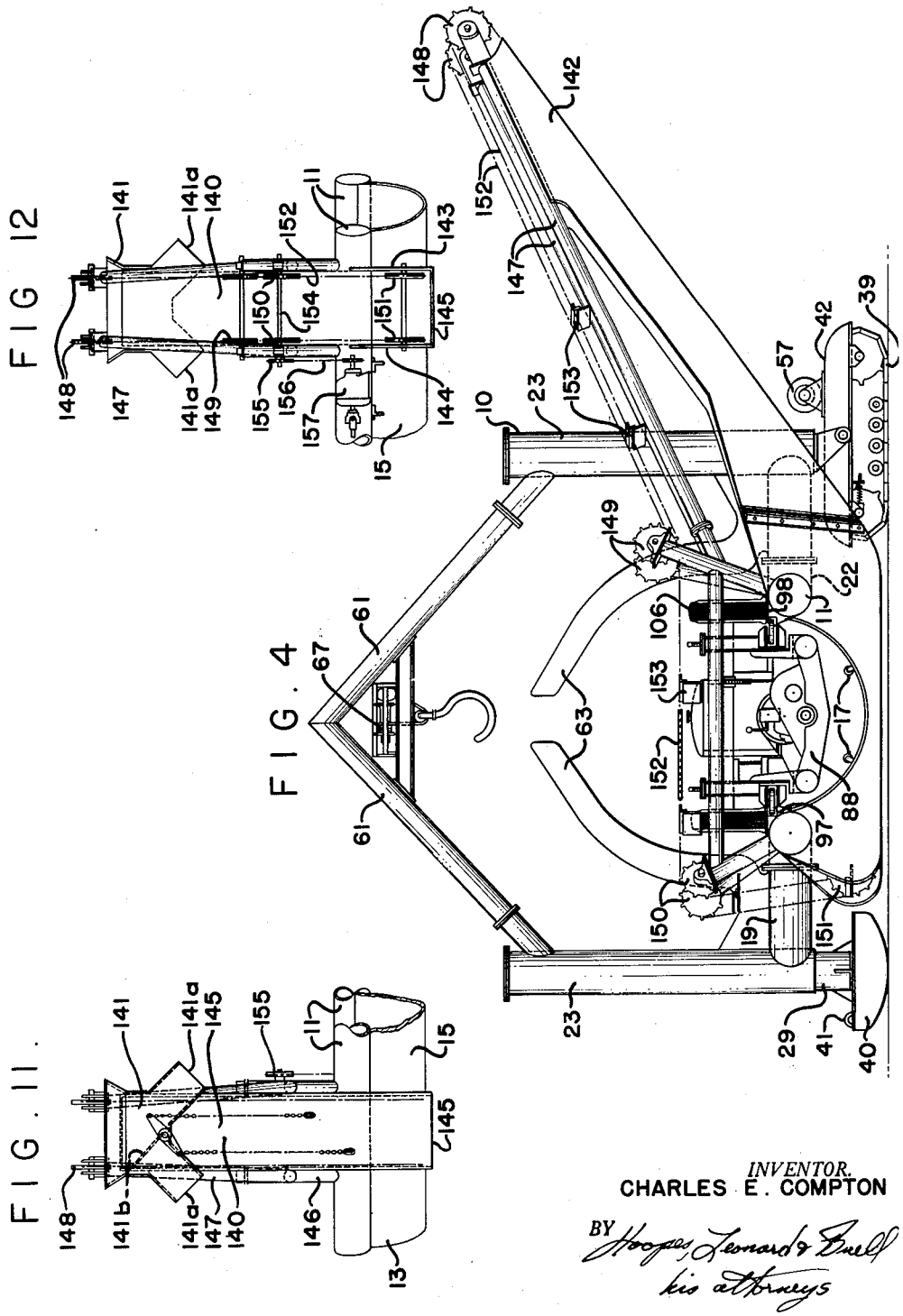

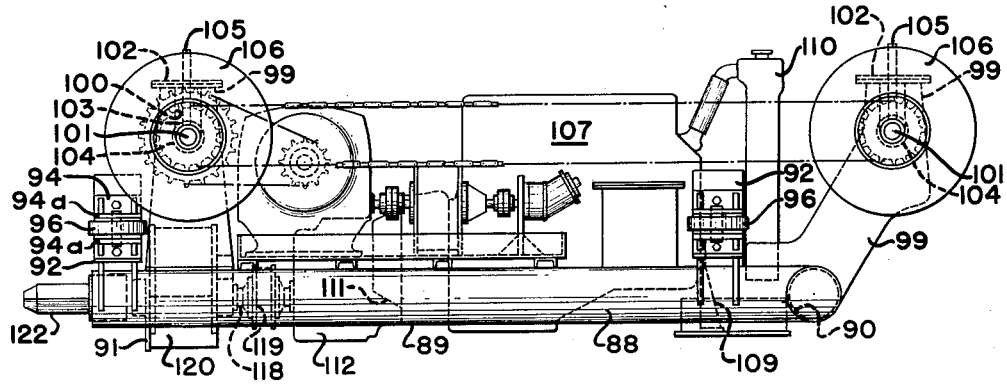
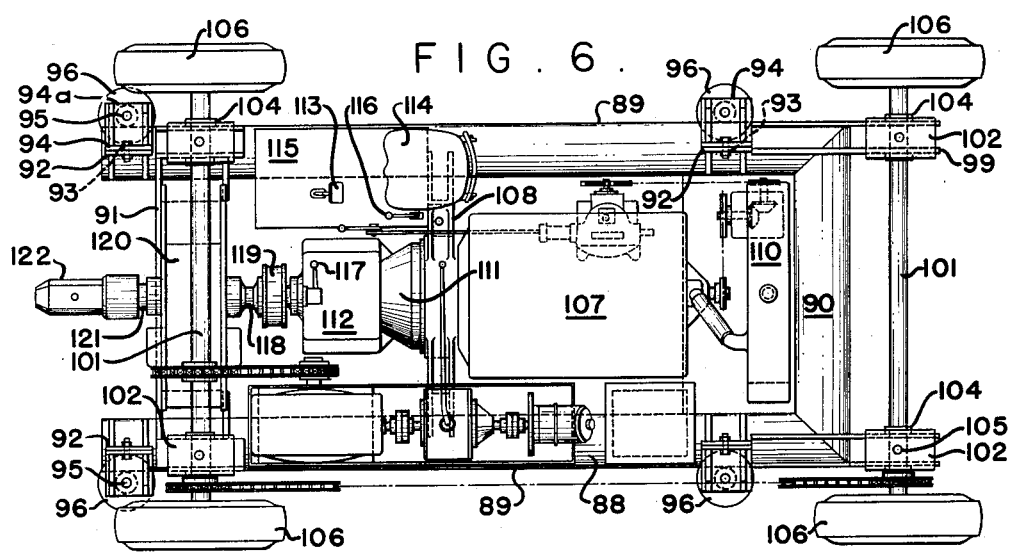
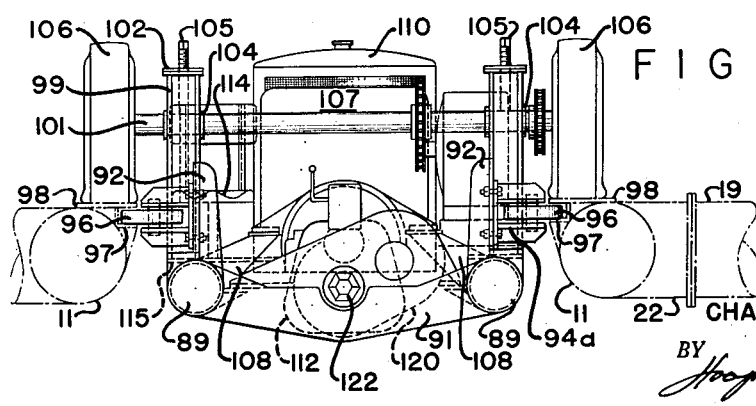

2,764,397

AUGER MINING APPARATUS HAVING RIGIDLY ATTACHED TRANSVERSE CONVEYOR

Charles E. Compton, Bridgeport, W. Va.

Continuation of application Serial No. 202,898, December 27, 1950. This application June 1, 1956, Serial No. 588,640

7 Claims. (Cl. 262—26)

This invention relates to mining apparatus, particularly mining apparatus for simultaneously mining material and delivering the material laterally to a delivery point comprising a frame, an elongated mining element carried by the frame, means for rotating and advancing the elongated mining element relatively to the frame to enter a body of material, form a bore therein and deliver material from the body outwardly through the bore and conveyor means extending transversely of the direction of advance of the elongated mining element, having the material receiving portion thereof positioned intermediate the ends of the elongated mining element and having a conveying element positioned to receive material delivered from the bore by the elongated mining element and convey the material to a delivery point generally at the side of the frame.

This application is a continuation of my copending application Serial No. 202,898, filed December 27, 1950, now abandoned. Features herein disclosed are claimed in my Patent No. 2,616,677.

Mining apparatus of the type above referred to is known to those skilled in the art as auger mining apparatus. An auger mining machine comprises a frame and an elongated mining element carried by the frame. The elongated mining element may comprise a cutter head at the leading end thereof and a conveyor, such, for example, as a spiral conveyor, behind and connected with the cutter head. Means are provided for rotating and advancing the elongated mining element relatively to the frame to enter a body of material, form a bore therein and deliver material from the body outwardly through the bore. The thus delivered material is loaded into trucks for hauling to an unloading point such as a coal tipple. The loading of the material into trucks is accomplished by conveyor means as above mentioned which extend transversely of the direction of advance of the elongated mining element. Such conveyor means as heretofore employed have comprised either a single conveyor or a series of conveyors separate from the auger mining machine having disadvantages which will be pointed out hereinafter.

I connect rigidly with the frame of the apparatus the material receiving portion of the conveyor means for loading the material into trucks, which conveyor means will be hereinafter sometimes referred to as a transfer carrier, so that the conveyor means or transfer carrier in effect forms an integral part of the mining apparatus. When the conveyor means is rigidly connected with the frame of the mining apparatus its position is determined by the position of the frame and the conveyor means moves with the frame whenever the frame is moved. The conveyor means extends transversely of the direction of advance of the elongated mining element, has the material receiving portion thereof positioned intermediate the ends of the elongated mining element and has a conveying element positioned to receive material delivered from the bore by the elongated mining element and convey the material through the material receiving portion of the conveyor means to a delivery point generally at the side of the frame of the mining apparatus. Such conveyor means or transfer carrier may have a single conveying element or mechanism conveying the material from the elongated mining element into the truck or may convey the material to an auxiliary conveyor which delivers it into the truck.

The rigid connection of the material receiving portion of the transfer carrier with the frame is important to a high rate of production in use of the mining apparatus. The separate conveyor previously employed had to be separately moved each time the auger mining machine finished forming one bore and was to be shifted into position for formation of the succeeding bore. Such separate movement of the transfer carrier required considerable time and labor. My apparatus can be shifted from one position to the next in a small fraction of the time required when a separate transfer carrier is employed.

The use of a separate transfer carrier also makes it necessary to prepare the ground in front of the body of material being mined to enable the transfer carrier to be disposed at a sufficiently low elevation to receive the mined material and also to insure that the transfer carrier is properly level. The making of the transfer carrier a rigid part of the frame of the auger mining machine obviates preparation of the ground for the reception of the transfer carrier and also obviates problems incident to leveling of the transfer carrier for proper operation. When the auger mining machine is shifted from one position to the next the transfer carrier, being an integral part of the machine, moves with it and if the ground at the point where the transfer carrier is to be positioned is somewhat too high the transfer carrier will be caused by the movement of the machine as a whole to form its own trench in the ground.

Comparative tests show that an auger mining machine equipped with a rigidly connected or integral transfer carrier as above described can be shifted from one position to the next and formation of the next bore started in two minutes or less whereas a time well in excess of five minutes and more often in the order of ten to fifteen minutes is required when a separate transfer carrier is employed.

The transfer carrier normally has a conveying element positioned to receive material delivered from the bore by the elongated mining element, and it is preferred to drive the conveying element from the means for rotating and advancing the elongated mining element. This is a further important feature of my apparatus. A single power plant drives both the elongated mining element and the conveying element. I preferably provide connections including clutch means between the means for rotating and advancing the elongated mining element and the means for driving the conveying element whereby the conveying element may be driven at will by the means for rotating and advancing the elongated mining element. Thus the machine operator without leaving his operating station may start and stop the conveying element at will while the elongated mining element continues to operate. When a separate transfer carrier is used it must have its own motive unit which cannot be operated from the operating station on the machine so that to start and stop the conveying element of the transfer carrier either the operator must leave his post on the machine and go over to the transfer carrier or an extra workman must be utilized for the purpose.

The conveying element may be an endless conveying element and in one form of apparatus the endless conveying element may extend completely about the elongated mining element. This has the advantage that only one reach of the endless conveying element is disposed beneath the elongated mining element, making it possible to recover material from the body of material mined closer to the floor or surface upon which the apparatus operates than when two reaches of the endless conveying element must pass one above the other below the elongated mining element. The so-called "wrap around" conveyor may save several inches in vertical space. When that saving is not important an endless conveying element with both reaches disposed below the elongated mining element may be satisfactorily employed.

The transfer carrier may extend at an acute angle to the direction of advance of the elongated mining element and the discharge portion of the transfer carrier may be positioned more remote from the transverse plane of the front end of the auger mining machine than the material receiving portion thereof to facilitate positioning of trucks to be loaded in position to receive the material without interference from the body of material being mined.

Other details, objects and advantages of the invention will become apparent as the following description of a present preferred embodiment thereof proceeds.

In the accompanying drawings I have shown a present preferred embodiment of the invention in which Figure 1 is a side view of a mining machine embodying the invention engaged in a mining operation;

Figure 2 is a side view on a somewhat larger scale of the mining machine with the elongated mining element detached therefrom (in Figures 1 and 2 the endless conveying element of the transfer carrier is not shown);

Figure 3 is a plan view of the mining machine with only a part of the elongated mining element shown;

Figure 4 is a front view of the mining machine on a still larger scale;

Figure 5 is a side view of the motor carriage forming a part of the mining machine;

Figure 6 is a plan view of the motor carriage;

Figure 7 is a front view of the motor carriage;

Figure 8 is a plan view of the transfer carrier forming a portion of the mining machine shown in Figure 4;

Figure 9 is a side view of the same transfer carrier when viewed while looking generally at the front of the mining machine;

Figure 10 is a detail view on a somewhat enlarged scale taken along the line X—X of Figure 9;

Figure 11 is an end view of the transfer carrier shown in Figure 9 taken from the delivery end thereof;

Figure 12 is an end view of the transfer carrier viewed from the other end thereof;

Figure 13 is a schematic representation of a hydraulic system suitable for use in controlling part of the operations of the mining machine;

Figure 14 is a side view of a control platform located on the side of the machine as shown in Figure 3 with the mechanism for operating the hydraulic system; and Figure 15 is a plan view of the mechanism shown in Figure 14.

Referring to the drawings, a massive elongated frame 10 is provided having side structural members 11 rigidly joined at the rear ends thereof by a bolster 12 welded or otherwise affixed to the structural members 11. At spaced intervals toward the forward end 13 of the frame 10, spanning structural members 14 in the form of plates having a generally invert or convex downwardly profile are also joined to the respective side structural members 11 by welding or otherwise. It will therefore be seen that the frame 10 is generally trough-shaped and that the forward end 13 is open. A pan 15 which is also convex downwardly fits the profile of the plates 14 to which the pan 15 is bolted or welded. The upper edges of the pan 15 are affixed to the side structural members 11. As will be seen from Figures 2 and 3, the pan 15 is made in two portions 15a and 15b so as to provide a transverse opening 16 therethrough adjacent the forward end 13. The various frame members such as the sides 11 may be made of well casing pipe, for example, which is of suitable strength. The forward portion 15a of the pan 15 is provided with supporting or pilot rollers 17 suitably journaled in brackets 17a fastened to pan portion 15a. Between mining operations the mining head assembly or elongated mining element 18 normally will rest on the rollers 17 and will be guidingly supported thereby when a mining operation begins.

Laterally projecting tubular members 19 of suitable strength are welded to the sides of members 11 at spaced intervals. Members 19 are provided with flanges 20 which cooperate with mating flanges 21 on arms 22. Arms 22 are welded to sides 11. The upright legs 23 of the mining machine are welded to the outer ends of members 19. In this way when the mating flanges 20 and 21 are bolted together the legs 23 become an integral and rigid part of the mining machine. On the other hand, since each leg unit 23 is relatively self-contained the entire leg assembly can be separated from the mining machine by uncoupling the respective flanges 21 and 20 if repairs are needed or the machine is to be moved over the public roads.

In the embodiment shown in Figure 4 traction treads 39 in the form of endless tractor tracks are provided on the legs 23 on one side only of the machine. On the other side of the machine the legs 23 and their sliding members 29 are provided with drag bases 40. These bases 40 are in the form of downwardly convex tubs and furnish a considerable support area to the legs on that side. At the same time they can readily be dragged and will slide over the ground during lateral movement of the machine when it is being moved between side-by-side mining stations along the working face of a coal seam such as the coal seam S in Figure 1 or any other mineral deposit. The drag bases 40 are provided with eyes 41 so that a tractor can be attached to the machine on that side if it is desired to drag it in a lateral direction with the drag bases 40 leading. In most situations that side of the machine having the traction treads 39 thereon will be used to move the machine laterally with the treads 39 in the lead. Where lateral movement in both directions may frequently take place, then it may be preferable to replace the drag bases 40 with traction tread assemblies similar to assemblies 39.

On top of platform 42 of each assembly 39 a combined hydraulic motor and gear reducer 57 of a conventional make is bolted and is connected to the corresponding traction tread to drive it.

Since there is independent driving control of each assembly 39, some turning of the machine about a vertical axis intermediate its ends is achievable to place, for example, the longitudinal axis of the machine normally to the working face of seam S at the next station whenever the face may not be straight. Further, as shown in Figure 1, the relative setting of the respective heights of the front and back legs 23 of the machine enable the longitudinal axis of the machine and therefore the longitudinal axis of the mining head assembly 18 to conform to the slope of the mineral seam S being mined. In this way the amount of worthless material mined can be reduced to a negligible amount and obviate mineral cleaning costs. In order to initially point or aim the mining head assembly 18 the axis of which generally coincides with the longitudinal axis of the mining machine of this invention, the axis of the mining machine is aligned when the mining head assembly 18 is retracted and out of seam S. When fully retracted, all helical conveyor sections 60 beyond the one immediately connected to the mining head 18 are removed and placed alongside the machine or stored in the superstructure of the machine. That superstructure comprises the arched beams 61 and conveyor section racks 63. In order to handle the conveyor sections 60 a conventional hydraulically operated winch 67 is carried by each pair of arched beams 61.

A motor carriage assembly 88 is shown in Figures 5 to 7 in somewhat greater detail than in the other figures of the drawings. Carriage 88 has a drop-center frame comprising side members 89, a rear bolster 90 rigidly connecting the side members 89. A front bolster 91 also rigidly connects the side members 89 at the other end of the frame 88. Upstanding rigid bracket supporting plates 92 are welded to the side members 89 adjacent the four corners of the carriage 88. These plates 92 are slotted at 93 for the reception of sliding brackets 94 similarly slotted for bolting to plates 92 at the selected height. Horizontal plates 94a are welded to the brackets 94 and support a vertical journal 95 of a guide roller 96. Suitable roller thrust bearings, for example, may be used with such journals and brackets. The guide rollers 96 project outwardly beyond the plates 94a in a transverse or lateral direction adjacent each of the corners of carriage 88.

A channel-shaped guide rail 97 engages the projecting portion of the respective guide rollers 96 as shown in Figure 7. The guide rails 97 extend along the inside of each of the side structural members 11 of the frame 10 and are rigidly fastened thereto. Thus, movement of the carriage 88 is limited by the guide rollers 96 and the guide rails 97 to longitudinal movement between the respective ends of the frame 10. Because of the positioning of these guide rollers 96 the carriage 88 is in effect a drop-center carriage placing it relatively close to the ground for maximum force and stability in operating the mining head assembly 18. As shown in Figure 2, the lower portions of the carriage 88 travel in the trough defined by the upper surface of the pan 15. The upper flange of the guide rail 97 is provided with a widened portion or a separate plate may be used to serve as a friction track 98 which is also fixed to the side members 11 along the length thereof.

Pedestals 99 are provided at the front and rear of the carriage 88 in fixed upstanding relation to the side members 89. The respective pairs of pedestals have vertical slots 100 therein for the accommodation of live axles 101. A cover 102 across the top of each pedestal closes the tops of the slots 100. In each slot 100, an upper inverted U-shaped bearing 103 is provided in vertically slidable relation only to the respective pedestal. In addition, the bottom of the respective slots 100 may be conventionally bushed. A threaded rod 105 passes through a tapped opening in cover 102 and acts as a screwdown against the top of the upper bearing 103 in each case. The outer ends of the front and rear axles 101 after passing through the slots 100 and bearings 103 are keyed to driving wheels 106 which are provided with conventional rubber tires. In addition, spacing collars 104 are affixed to each axle 101 just inwardly of the respective pedestals 99. The turning of the threaded rods 105 adjusts the height of the respective wheels 106 so that appropriate pressure is obtained between the wheels 106 and the surface of the respective tracks 98, the surface of which may be roughened for better gripping. The adjustment of the height of the brackets 94 must be correlated with the height of the axles 101 to maintain rollers 96 in the center of channels 97 and avoid undue friction therebetween.

An internal combustion engine such as diesel engine 107 is provided to drive the wheels 106. Engine 107 is suitably and rigidly mounted on the side members 89 by means of the brackets 108 and 109. A conventional radiator 110 is also mounted on the frame of carriage 88 adjacent and connected to the engine 107. The engine 107 is provided with a conventional clutch and flywheel housing mechanism 111 within which a shaft passes into a transmission assembly enclosed in the transmission housing 112. A clutch pedal 113 operates the clutch in housing 111 and is controlled by a driver sitting in a driver's seat 114 on the right side of the carriage 88. A floor 115 for the driver is welded or bolted to the carriage 88.

A conventional fuel throttle 116 is placed beside the driver's seat 114 to run the engine 107 at the desired speed. In addition, a transmission shift lever 117 is within reach of the driver to apply the desired forward or reverse rotational speed to a conventional flexible coupling 119 or to let the engine 107 idle in neutral without turning mining head assembly 18. Coupling 119 may be constructed to break if mining head assembly 18 strikes an impenetrable obstruction in the course of a mining operation and thereby protect the other mechanism of carriage 88. A speed reducer 120 is bolted to front bolster 91 and is operatively connected to the output side of transmission 112 by a shaft 118.

A male coupling 122 is fixed to the output shaft 121 of speed reducer 120. The male member 122 is polygonal in section so as to fit into a socket of corresponding section; such a socket is welded at the rearward end of each helical section 60. The forward ends of the helical sections 60 are provided with male coupling members similar to coupling 122. In that way, the mining head assembly 18 can be made of indefinite length by adding such sections 60 in the course of a mining operation at a single station, the couplings being maintained coupled by the coupling pins. Thereby the mining head 18 can cut its way into the seam S for a distance several times as long as the length of the frame 10 of the mining machine operating the mining head assembly 18.

In the course of a usual mining operation, the mining head assembly 18 is rotated by carriage 88 in a direction so as to screw the helical blades 65 into the bore being cut in the seam S by the head 18. Such a direction of rotation while the carriage 88 is moving forward causes the mineral being mined to be passed along between the turns of the blades 65 toward the transverse opening 16 at the forward end of the pan 15. A transfer carrier 140 which is more fully illustrated in Figures 8 to 12, removes such mined mineral from the mining machine and transfers it to a delivery hopper 141 which is sufficiently high so that trucks or railroad cars or other vehicles may be directly loaded therefrom. Transfer carrier 140 is provided with a chute 142 having a front wall 143, a rear wall 144 and a bottom 145, making the chute generally U-shape in cross section normal to the bottom as shown in Figure 10. This chute 142 passes beneath the transverse opening 16 which is not wider than the width of the chute 142. The front and back walls 143 and 144 of the horizontal portion of the chute are cut out so that they correspond in profile to the edges of the pan 15 along the respective edges of the opening 16. Such chute walls may be bolted to such edges. As a result mined material moved rearwardly by the blades 65 falls through opening 16 into the bottom of chute 142 immediately beneath that opening.

While the chute 142 is transversely positioned relative to the longitudinal axis of the mining machine of this invention, it is generally not normal thereto so that the receiving end of the carrier 140 can be positioned as close as possible to the front edge 13 of the mining machine which in turn is as close to the working face of the mineral deposit as possible (see Figures 1 and 8). On the other hand, the delivery hopper 141 must be positioned sufficiently far away so that a truck or a pair of trucks or other vehicles can fit beneath the two discharge openings therein. For that reason delivery hopper 141 is positioned rearward of the other end of the carrier 140. While the arms 146 may be fixedly attached to the forward ends of the side members 11, the booms 147 and chute 142 are appropriately bolted to the frame 10 and pan 15 respectively in order to permit their removal when the machine is to be transported. The upper ends of the booms 147 are provided with sprockets 148 journalled in the clevises thereof. In addition, sprockets 149, 150 and 151 are respectively journalled as shown in Figures 8 to 12 inclusive to complete the supporting members for the polygonal encirclement of the transfer carrier 140 by two parallel endless sprocket chains 152. These chains extend around the respective sprockets and scrape along the bottom 145 of the chute substantially over the entire length thereof. Scrapers 153 are connected between the parallel endless chains 152 and maintained in a position normal to the bottom 145 as the chain passes over it. The height of the scrapers 153 may be made sufficient, if desired, to extend somewhat above the lowermost portion of the opening 16 but out of the path of the blades 65. As viewed in Figure 9 the endless chains 152 moving in parallel formation rotate in a counterclockwise direction. Rails 145a may be fastened along both sides (as shown in Figure 10) past the bend in bottom 145 to insure movement of chains 152 and scrapers 153 close to bottom 145. Thereby mined mineral deposited through the opening 16 is removed upwardly along the bottom 145 of chute 142 and dumped into the discharge hopper 141. The two discharge openings 141a of hopper 141 are controlled by a gate 141b which can be thrown from one side to the other as may be seen in Figure 11 successively to fill a truck first on the one side and then to fill a truck on the other.

The shaft 154 connecting the sprockets 150 is also the drive shaft for the parallel endless chains 152. A sprocket 155 keyed to one end of shaft 154 is rotated by a sprocket chain 156 geared to a speed reducer 157. The speed reducer 157 is fastened to a small platform which in turn is welded or bolted to frame 10 as shown in Figures 8 and 12.

Along the side of frame 10 adjacent the driver of the carriage 88 there is provided a control platform 82 which is bolted or otherwise removably fastened to the adjoining side member 11. An internal combustion engine 159 is mounted on platform 82 and fastened thereto. The engine 159 is provided with a conventional clutch housed in housing 180 and operated by a clutch lever 181. A shaft 182 keyed to the driven portion of the clutch in housing 180 extends through a coupling 183, journal bearing 184, an hydraulic circuit clutch 185, and a further journal bearing 186 to the drive portion of a transfer carrier clutch 187 which drive portion is thus turned. A shaft 188 operatively connects the driven portion of clutch 187 to speed reducer 157. A clutch lever 189 controls the operation of clutch 187 and when that clutch is disengaged, shaft 188 ceases its rotation stopping the movement of the endless chains 152.

A clutch lever 190 controls the operation of the hydraulic circuit clutch 185. The driven portion of clutch 185 is operatively connected to a hub 191 to which are keyed the sprockets 192 and 192'. The hub 191 floats on the shaft 182 and is not turned thereby except when clutch 185 is engaged by the lever 190. Thereby, the lever 181 can control the operation both of the hydraulic circuit and of the transfer carrier whereas the respective clutch levers 189 and 190 respectively control the transfer carrier operation and the hydraulic circuit operation independent of one another so long as the clutch in housing 180 remains engaged. Platform assembly 82 may be operated by the driver of carriage 88 or by a second operator. In the latter case, since the platform is within voice distance of the driver in carriage 88, such correlation as may be desirable can be obtained between them.

An hydraulic circuit which may be used in the machine of this invention is illustrated in Figure 13 by way of example only. As is well understood by those in the hydraulic circuit art, various other such circuits may be devised. For convenience, the circuit shown in Figure 13 has been provided in two parts respectively for the rear and front. These parts bear the same reference numerals except that the circuit portions for the front of the mining machine of this invention are primed. Thus the sprockets 192 and 192' respectively operate the hydraulic pumps 160 and 160' by means of the sprocket chains 161 and 161' respectively. The hydraulic pumps 160 and 160' take their suction respectively from hydraulic fluid reservoirs 162 and 162'. Hydraulic fluid pumped by such hydraulic pumps respectively passes through relief valves 163 and 163' which remain normally closed to the exhaust pipes 164 and 164' respectively so long as the hydraulic pressure on the pressure side of the system does not exceed the safety setting. Hydraulic fluid under pressure passes through inlet pipes 165 and 165' to gang valves 166 and 166' which gang valves are of a conventional nature having individual control handles on each valve therein for an operator standing on the control platform 82. Exhaust pipes 167 and 167' extend from the common exhaust of the gang valves 166 and 166' to the respective reservoirs 162 and 162'.

In the following description of the hydraulic circuit illustrated in Figure 13, only the rear half thereof will be described. The operation of the front half of the hydraulic circuit is substantially identical and takes place through the correspondingly numbered, but primed, members. Thus, pipes 168 and 169 separately lead to the hydraulic cylinders 26 connected to the rear pair of legs of the mining machine illustrated. The flow of fluid through pipe 168 or through pipe 169 or through both is controlled by the operation of the individual handles, not illustrated, on the unit concerned of the gang valve 166. Thus, rear legs 23 can be independently or together adjusted to the desired height by the extension of the plunger 28 concerned and then held in that adjusted position by the shifting of the aforesaid handle or handles, as is well understood, to the hold position. When it is desired to lower one or both of the said rear legs, the handle or handles concerned can be moved to the release or exhaust position permitting the hydraulic fluid in the cylinder 26 concerned to flow back through pipe 168 or 169 or both as the case may be into exhaust pipe 167 and thence into pipe 164 and the reservoir 162. The lowering of either or both rear legs by the retraction of one or both plungers 28 when the handle or handles concerned are in the exhaust position is obtained by virtue of the weight of the mining machine tending to foreshorten the rear leg or legs 23 in question. If, for some reason, the pressure either in pipe 168 or 169 or both should exceed the safety pressure, which is above that exerted by the weight of the machine alone, relief will be obtained through relief valves 170 and 171 and pipes 172 and 173 respectively. These relief valves offer no hindrance to the flow of hydraulic fluid in the respective pipes 168 and 169 in either direction.

Similarly, the winch motor 69 on the rear winch is controlled by the unit valve which is second from the left as viewed in Figure 13, of the gang valve 166. In the operation of this winch motor 69, the hydraulic circuit extends through pipes 174, the motor 69 and exhaust pipe 176 for rotation of the motor in one direction and through the pipe 175, winch motor 69 and exhaust pipe 176 for rotation of the winch motor in the opposite direction. Exhaust pipe 176 is connected to pipe 164 whereby hydraulic fluid flowing in the winch motor circuit may be returned to reservoir 162. Again, there is a hold position of the control handle on the winch unit valve in accordance with standard practice for such valves.

The rear traction tread assembly 39 is controlled in its direction of movement by the rotation of hydraulic motor 57. Rotation in one direction is effected therein by the flow of hydraluic fluid through pipe 177, the motor 57 and exhaust pipe 179, while rotation in the other direction is effected by the flow of hydraulic fluid through pipe 178, the motor 57 and exhaust pipe 179. Exhaust pipe 179 is connected between motor 57 and the exhaust pipe 164 leading to the reservoir 162. The control handle for the unit valve operating the rear motor 57 is not shown but provides a hold or hydraulic lock position in addition to the rotational positions.

Although not shown, as is well understood in the art, it is possible by using flexible or sliding connections for the hydraulic circuit controls to be mounted on a panel on carriage 88 instead of platform 82. In such a case a single operator can operate both the hydraulic circuit shown in Figure 13 and the carriage 88. Such operations would generally alternate inasmuch as the legs 23 are adjusted and the winches are usually used at times when the carriage is not operating. The operation of the transfer carrier mover 159 however, will normally be continued throughout the entire operation of motor carriage 88 while mining.

At the inception of a mining operation usually but a single helical conveyor section 60 is coupled to coupling 122 and included in mining head assembly 18. At such start of a mining operation, moreover, the carriage 88 is usually fully retracted and at the back near the bolster 12. In this arrangement, the front of the conveyor section 60 and the mining head is supported by the pilot rollers 17. As shown, their axes are longitudinal and parallel to the axis of the mining machine but they may be offset so as to be normal to the angle of pitch of the outer edge of the helical blades 65 in contact therewith. Thus, as carriage 88 is moved forward with the mining head assembly 18 rotating so as to "screw" the blade 65 following the head 18 into the working face of seam S, the rollers 17 continue their support. However, when the mining head itself has cut a kerf into the working face of the mineral deposit or seam S, it frequently makes the forward end of the mining head assembly 18 self-supporting. Under those circumstances, if desired, the front legs 23 can be lowered very slightly, thereby lowering rollers 17 out of any possible contact with the blade 65, without destroying the axial alignment between mining head assembly 18 and carriage 88. The helical conveyor sections 60 are made sufficiently strong and rigid to avoid bending which would lead to objectionable rubbing or wear during operation of the mining machine.

There may be cases in which it may be desirable or convenient to support the mining head assembly intermediate the ends thereof in the course of a mining operation by means other than the edges of the blades of the helical conveyor sections. For example, where a seam of mineral is small and may helical conveyor sections are employed, the slenderness ratio of the mining head assembly may make such intermediate support desirable. Or it may be desirable to reduce the drag of the helical conveyor blades during mining.

Various changes in the details and arrangements of this invention may be made without departing from the spirit thereof or the scope of the appended claims.

I claim:

1. Mining apparatus for simultaneously mining material and delivering the material laterally to a delivery point comprising a frame, an elongated mining element carried by the frame, means for rotating and advancing the elongated mining element relatively to the frame to enter a body of material, form a bore therein and deliver material from the body outwardly through the bore and conveyor means connected with the frame to move therewith extending transversely of the direction of advance of the elongated mining element, having its receiving end positioned intermediate the ends of the elongated mining element and having an endless conveying element extending completely about the elongated mining element to receive material delivered from the bore by the elongated mining element and convey the material to a delivery point generally at the side of the frame.

2. Mining apparatus for simultaneously mining material and delivering the material laterally to a delivery point comprising a frame, an elongated mining element comprising a cutter head at the leading end thereof and a spiral conveyor behind and connected with the cutter head, the elongated mining element being carried by the frame, means for rotating and advancing the spiral conveyor and consequently rotating and advancing the elongated mining element relatively to the frame to enter a body of material, form a bore therein and deliver material from the body outwardly through the bore and conveyor means connected with the frame to move therewith extending transversely of the direction of advance of the elongated mining element, having its receiving end positioned intermediate the ends of the spiral conveyor and having an endless conveying element extending completely about the spiral conveyor to receive material delivered from the bore by the elongated mining element and convey the material to a delivery point generally at the side of the frame.

3. Mining apparatus for simultaneously mining material and delivering the material laterally to a delivery point comprising a frame, an elongated mining element carried by the frame, means for rotating and advancing the elongated mining element relatively to the frame to enter a body of material, form a bore therein and deliver material from the body outwardly through the bore, a chute having a material receiving portion positioned intermediate the ends of the elongated mining element to receive material delivered from the bore by the elongated mining element and extending transversely of the direction of advance of the elongated mining element, the chute being rigidly connected with the frame so as in effect to form an integral part of the mining apparatus, whose position is determined by the position of the frame and which moves therewith whenever the frame is moved, a conveying element operable in the chute to convey the material through the chute to a delivery point generally at the side of the frame and means for operating the conveying element.

4. Mining apparatus for simultaneously mining material and delivering the material laterally to a delivery point comprising a frame, an elongated mining element carried by the frame, means for rotating and advancing the elongated mining element relatively to the frame to enter a body of material, form a bore therein and deliver material from the body outwardly through the bore, a pan receiving material delivered from the bore by the elongated mining element, a chute having a material receiving portion positioned intermediate the ends of the elongated mining element to receive material delivered from the bore over the pan by the elongated mining element and extending transversely of the direction of advance of the elongated mining element, the chute being rigidly connected with the frame so as in effect to form an integral part of the mining apparatus, whose position is determined by the position of the frame and which moves therewith whenever the frame is moved, a conveying element operable in the chute to convey the material through the chute to a delivery point generally at the side of the frame and means for operating the conveying element.

5. Mining apparatus for simultaneously mining material and delivering the material laterally to a delivery point comprising a frame, an elongated mining element carried by the frame, means for rotating and advancing the elongated mining element relatively to the frame to enter a body of material, form a bore therein and deliver material from the body outwardly through the bore, a pan receiving material delivered from the bore by the elongated mining element, the pan having an opening therein, a chute having a material receiving portion positioned intermediate the ends of the elongated mining element to receive material delivered from the bore through the opening in the pan by the elongated mining element and extending transversely of the direction of advance of the elongated mining element, the chute being rigidly connected with the frame so as in effect to form an integral part of the mining apparatus, whose position is determined by the position of the frame and which moves therewith whenever the frame is moved, a conveying element operable in the chute to convey the material through the chute to a delivery point generally at the side of the frame and means for operating the conveying element.

6. Mining apparatus for simultaneously mining material and delivering the material laterally to a delivery point comprising a frame, an elongated mining element carried by the frame, means for rotating and advancing the elongated mining element relatively to the frame to enter a body of material, form a bore therein and deliver material from the body outwardly through the bore, a chute having a material receiving portion positioned intermediate the ends of the elongated mining element to receive material delivered from the bore by the elongated mining element and extending transversely of the direction of advance of the elongated mining element, the chute being rigidly connected with the frame so as in effect to form an integral part of the mining apparatus, whose position is determined by the position of the frame and which moves therewith whenever the frame is moved, a conveying element operable in the chute to convey the material through the chute to a delivery point generally at the side of the frame, means for operating the conveying element and connections including clutch means between the means for rotating and advancing the elongated mining element and the means for operating the conveying element whereby the conveying element may be operated at will by the means for rotating and advancing the elongated mining element.

7. Mining apparatus for simultaneously mining material and delivering the material laterally to a delivery point comprising a frame, an elongated mining element carried by the frame, means for rotating and advancing the elongated mining element relatively to the frame to enter a body of material, form a bore therein and deliver material from the body outwardly through the bore, a chute having a material receiving portion positioned intermediate the ends of the elongated mining element to receive material delivered from the bore by the elongated mining element and extending transversely of the direction of advance of the elongated mining element, the chute being rigidly connected with the frame so as in effect to form an integral part of the mining apparatus, whose position is determined by the position of the frame and which moves therewith whenever the frame is moved, a conveying element operable in the chute to convey the material through the chute to a delivery point generally at the side of the frame, means for operating the conveying element and supporting means carried by the frame for supporting the elongated mining element at a level above the level of the material receiving portion of the chute.

References Cited in the file of this patent

UNITED STATES PATENTS

| | | |
|---|---|---|
| 956,463 | Wittich | Apr. 26, 1910 |
| 2,394,194 | McCarthy | Feb. 5, 1946 |

OTHER REFERENCES

"Coal Age," December 1948, pages 76 and 77.